United States Patent [19]
Proctor

[11] 3,723,594
[45] Mar. 27, 1973

[54] RARE EARTH REMOVAL FROM AMERICIUM OXIDE

[75] Inventor: Stephen G. Proctor, Denver, Colo.

[73] Assignee: The United States of America as represented by the United States Atomic Energy Commission

[22] Filed: May 18, 1972

[21] Appl. No.: 254,687

[52] U.S. Cl..............423/11, 176/16, 252/301.1 R, 260/429.1, 423/18, 423/250
[51] Int. Cl. ..............................................C01g 56/00
[58] Field of Search....423/11, 18, 250; 252/301.1 R; 260/429.1; 176/10, 14, 16

[56] References Cited

UNITED STATES PATENTS

| | | |
|---|---|---|
| 3,463,619 | 8/1969 | Ritter et al. ...........................423/10 |
| 2,577,097 | 12/1951 | Werner ..................................423/11 |
| 3,554,867 | 1/1971 | Thompson......................252/301.1 R |
| 2,681,923 | 6/1954 | Asprey et al. .....................260/429.1 |
| 3,445,201 | 5/1969 | Wheelwright....................260/429.1 |
| 3,551,119 | 12/1970 | Werner..........................252/301.1 R |

Primary Examiner—Carl D. Quarforth
Assistant Examiner—F. M. Gittes
Attorney—Roland A. Anderson

[57] ABSTRACT

Americium oxide materials having rare earths as impurities may have these removed by oxidizing the americium to the hexavalent state, precipitating and removing rare earth values using hydrofluoric acid, reducing the americium to the trivalent state, thereafter precipitating and removing americium oxalate using oxalic acid, and calcining the americium oxalate to americium oxide.

3 Claims, 1 Drawing Figure

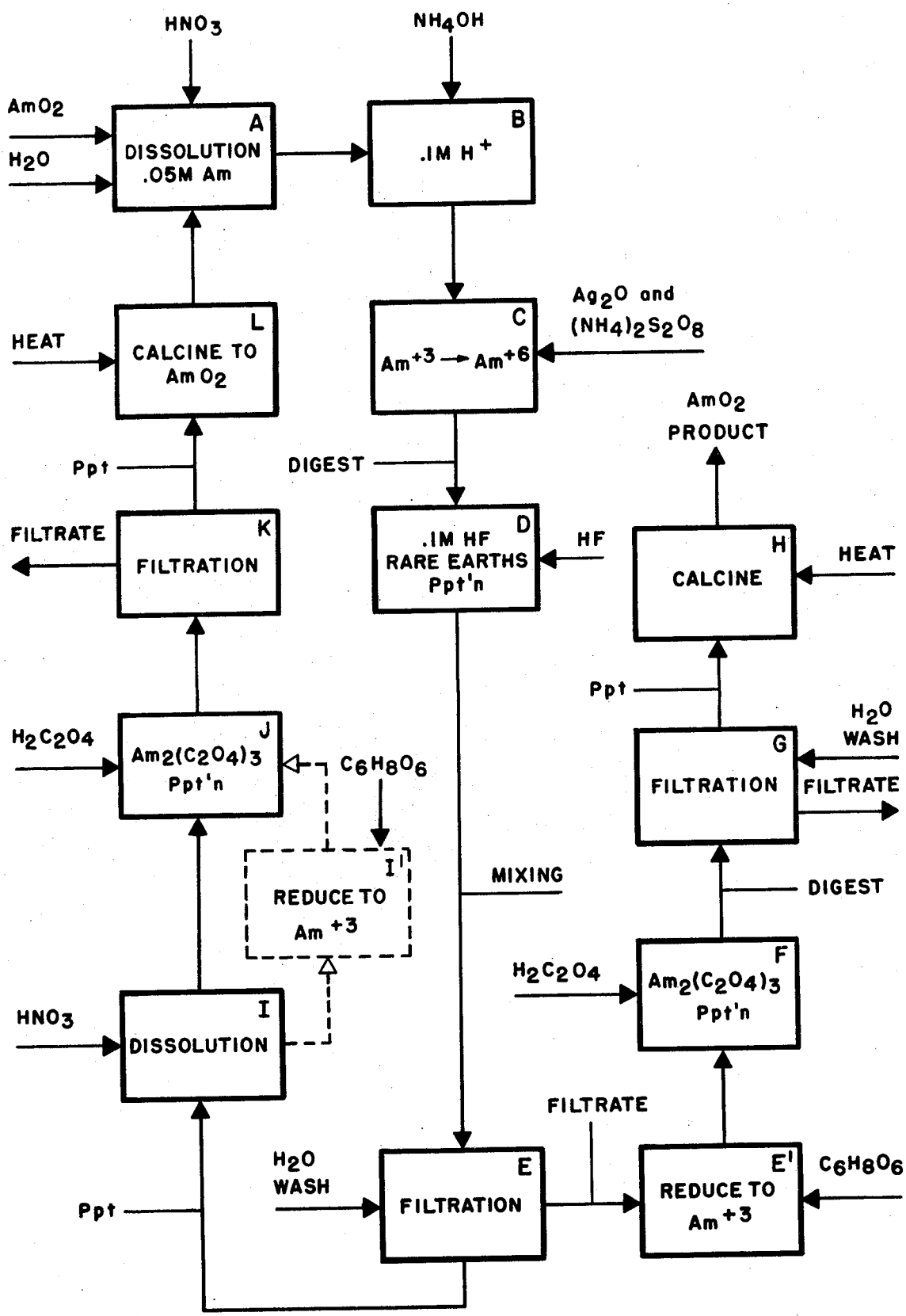

3,723,594

RARE EARTH REMOVAL FROM AMERICIUM OXIDE

BACKGROUND OF INVENTION

Uses for high purity americium are well known in the art both as starter material for preparing heavier elements and as a radiation source and fissile material. Prior processes for americium purification include such as the Talspeak method of solvent extraction, americium complexing methods using organophosphorous chelating agents, and the thiocyanate anion exchange procedure which is a multistep process generating considerable amounts of waste solutions which may be radioactive and yielding a product lacking in optimum purity requirements. Routine production grade americium oxide will ordinarily contain from 0.5 to 5.0 weight percent impurities, a major proportion being the rare earth elements. These undesirable results derived from prior purification processes were especially evident in regard to the rare earths since these have properties very similar to properties of americium. Americium "bomb" reduction residues which contain the rare earths as impurities are created in the calcium reduction of americium tetrafluoride to metal in a sealed bomb. Although prior art processes easily removed other salts such as calcium fluoride, magnesium oxide, calcium chloride, etc., from these residues, the similarities in the chemistries of the rare earths and americium make an effective separation difficult and most purification procedures do not yield a quantitative separation.

SUMMARY OF INVENTION

It is therefore an object of this invention to provide a novel method of selectively separating americium from rare earth elements.

It is an object of this invention to provide a method for americium separation from the rare earths that yields high purity americium and does not result in excessive waste solutions which may be radioactive and the attendant problems involved in disposing of said solutions.

These and other objects and advantages will become more apparent from the detailed description hereinafter included, and the most novel features will be particularly pointed out hereinafter in the appended claims. It will be understood that various changes in the materials, details and steps of the process, which are herein described and illustrated to bring out the nature of the invention may be made by those skilled in the art without departing from the scope of the invention.

The invention comprises dissolving americium oxide, adding ammonium persulfate and argentic oxide to oxidize the americium to the hexavalent state, precipitating and filtering the rare earth fluoride precipitates with a suitable agent such as hydrofluoric acid, reducing the americium to the trivalent state, precipitating and filtering americium oxalate using oxalic acid, and calcining the americium oxalate to americium oxide.

DESCRIPTION OF DRAWING

The drawing illustrates a preferred flow diagram of the process.

DETAILED DESCRIPTION

In this invention, an americium containing material which includes rare earth impurities may be dissolved in a suitable acid (Step A) such as nitric, hydrochloric, nitric-hydrofluoric and mixtures thereof at appropriate concentrations. As may be seen in the drawing, americium oxide (such as $AmO_2$) may be readily dissolved in about 8 M nitric acid. Water may be added to the nitric acid containing the dissolved americium oxide and impurities to dilute the americium concentration to a concentration in the range of from about 0.05 Molar (M) to about 0.30 M thus forming a first solution. The term "solution" as herein referred to will include the liquid, and when reference is made to a liquid containing a precipitate will include the precipitate also. Precipitations conducted from more concentrated americium (Am) solutions, such as above about 0.3 M Am, may result in fairly high Am losses to the rare earth fluoride precipitates. The low Am concentration cited above (i.e., from about 0.05 M to about 0.30 M Am) results in considerably lower losses to the fluoride precipitates. Am losses experienced in the rare earth fluoride precipitates may be attributed to the autoreduction of the hexavalent Am to the trivalent Am. The formation of hydrogen peroxide by the radiation of Am may be the main cause of the autoreduction. Precipitations effected using this invention with americium concentrations above 0.30 M may result in only partial separation of the rare earths from americium because of the autoreduction stated above, but the purity of the Am product which is separated may make this method useful for small scale quantities of Am. The Am that may not be initially purified may be easily recovered and recycled through the process as will be explained later. The quantities of Am used may be of such size as the equipment available can adequately handle without presenting a hazard to equipment or personnel. Am batch sizes which have been successfully used have ranged in quantities from about 8 to about 20 grams.

After Step A is completed, the acidity of the first solution is adjusted to about 0.1 M (0.1 M H$^+$) using a suitable base. As shown in the drawing, ammonium hydroxide ($NH_4OH$) which may be at any suitable molarity such as about 3 M or 8 M may be used to attain the desired acidity (Step B). Thereafter the solution may be heated to about 80° C and an excess of a suitable oxidizing agent may be added to selectively oxidize the Am to the hexavalent state. The excess is required to insure complete oxidation of Am. As seen in Step C of the drawing, an about 25 percent mole excess of ammonium persulfate [$(NH_4)_2 S_2O_8$] may perform the selective oxidation of Am to the hexavalent state forming a second solution. Better results may be attained by also making the solution about 0.002 M in argentic oxide ($Ag_2O$). This second solution may be digested by heating to about 80° C for a sufficient time to insure complete oxidation to the hexavalent state. Times used with success are about 30 to about 40 minutes. After digestion, the second solution may be made from about 0.1 M to about 0.3 M in hydrofluoric acid (Step D) and mixed for a sufficient time to allow good mixing such as from about 3 to about 10 minutes yielding a third solution which contains the precipitated rare earth fluorides and hexavalent Am in the liquid. After about 10 minutes, the precipitate may be removed by any suitable means such as filtration (Step E) and the precipitate washed, preferably as few times as will safely insure removal of Am, with water. The washings are retained and added to the third solution filtrate. The purified Am retained in the filtrate solution may be precipitated by first adding ascorbic acid ($C_6H_8O_6$) until the brown color of hexavalent Am has disappeared and Am in the hexavalent state has been reduced to trivalent Am (Step E') and then adding a suitable excess such as about 0.1 M to 0.2 M excess of oxalic acid forming a fourth solution (Step F) which may be digested at about 60° C for about 30 minutes. This fourth solution may be cooled to ambient temperature and digested for about 10 hours and thereafter separated through suitable means (Step G) such as filtration, centrifugation, decantation, etc., and the precipitate washed with water. The americium oxalate [$Am_2(C_2O_4)_3$] may be thereafter calcined to the oxide at about 600° C for about 4 to 6 hours (Step H). The Am product is of very high purity and contains less than the optical emission spectroscopic detection limits for the rare earths. As shown in the drawing, the precipitate removed from the filtration (Step E) may thereafter be dissolved (Step I) in a suitable acid such as nitric acid to insure complete removal of the fluoride ion contamination. If Am is in the hexavalent state, ascorbic acid may be added to reduce to the trivalent state (Step I'). Oxalic acid may thereafter be added to the acid containing the dissolved rare earths fluoride precipitates (Step J) which results in americium oxalate precipitation. The americium oxalate precipitate may be separated by appropriate means such as filtration and the precipitate washed with water (Step K). The americium oxalate precipitate may thereafter be calcined to the starting product $AmO_2$ as shown in Step L. This product may then be dissolved in Step A and the whole process recycled through the above initial steps to achieve greater Am recovery.

The table below illustrates the results achieved using this process. The americium oxide ($AmO_2$) material used in batches 1 through 7 (Group I) and batches 8 and 9 (Group II) was different. $AmO_2$ was divided into batches of approximately 20 grams each which were treated identically for the rare earth separation. The work was carried out in one liter pyrex beakers using a stirring hot plate. Each batch was dissolved initially in about 250 ml of about 8 M $HNO_3$ which gave an Am concentration of 0.28 M. Following dissolution, the acidity of the solution was adjusted to 0.1 M with 8 M $NH_4OH$. The solution was then heated to 80° C and made 0.25 M in ammonium persulfate and 0.002 M in argentic oxide. The solution temperature was maintained at 80° C for 40 minutes to allow for complete oxidation of the Am to the hexavalent state. The solution volume at this point was maintained at about 0.5 liter. The rare earths were then precipitated by making the solution 0.2 M in HF. After mixing for approximately 3 minutes, the insoluble fluoride material was removed from solution by filtration and washed with water. The fluoride residue was calcined and set aside for recycling or discarding. The Am in the resulting filtrate was reduced to the trivalent state by adding ascorbic acid until the brown color disappeared. Am was then precipitated as an oxalate by adding a 0.1 M stoichiometric excess of oxalic acid and heating the solution to 60° C. After an overnight digestion period at room temperature, the americium oxalate was filtered, washed with water, and calcined at 600° C for 6 hours. The resulting $AmO_2$ was sampled for rare earth impurities.

Group I $AmO_2$ contained 800 parts per million rare earth impurities. Rare earth concentrations were erbium (Er) 100 ppm, thulium (Tm) 300 ppm, yttrium (Y) 300 ppm, and ytterbium (Yb) 100 ppm. Group II $AmO_2$ contained 47,000 ppm rare earth impurities comprised of thulium (Tm) 40,000 ppm, cerium (Ce) 700 ppm, neodymium (Nd) 3,000 ppm, yttrium (Y) 3,000 ppm, and ytterbium (Yb) 300 ppm. Table I shows the results of the analysis after the rare earth removal for all nine batches analyzed by emission spectroscopy.

TABLE I

RARE EARTH IMPURITIES AFTER PURIFICATION

|  | Batch No. | Ce ppm | Er ppm | Tm ppm | Y ppm | Yb ppm | Nd ppm |
|---|---|---|---|---|---|---|---|
| Group I | 1 | <500 | <50 | <50 | <5 | <5 | <50 |
|  | 2 | <500 | <50 | <50 | <5 | <5 | <50 |
|  | 3 | <500 | <50 | <50 | <5 | <5 | <50 |
|  | 4 | <500 | <50 | <50 | <5 | <5 | <50 |
|  | 5 | <500 | <50 | <50 | <5 | <5 | <50 |
|  | 6 | <500 | <50 | <50 | <5 | <5 | <50 |
|  | 7 | <500 | <50 | <50 | <5 | <5 | <50 |
| Group II | 8 | <500 | <50 | <50 | <5 | <5 | <50 |
|  | 9 | <500 | <50 | <50 | <5 | <5 | <50 |

(<) — Indicates less than detectable limit of emission spectrographic analysis.
ppm — $\mu$ g of impurity/gram of $AmO_2$ The $AmO_2$ produced by processing the above nine batches of the table were combined into batches 10, 11 and 12 of about equal weight. Calorimetric assay for each of the three batches is shown in Table II. All three batches compared favorably with the theoretical value of 0.8828 grams Am per gram of $AmO_2$.

TABLE II

CALORIMETRIC ASSAYS OF $AmO_2$

| Batch No. | Grams of $AmO_2$ | Grams of Am | Grams Am/ Grams $AmO_2$ |
|---|---|---|---|
| 10 | 50.1 | 44.2 | 0.882 |
| 11 | 50.0 | 44.2 | 0.884 |
| 12 | 50.2 | 44.3 | 0.883 |

The average batch recovery as high purity americium oxide ($AmO_2$) was 90.8 percent which is quite favorable compared to prior production losses. Individual batch recoveries ranged from 88 to 93 percent.

An alternate mode of performing the separation of the rare earths from Am may use Steps A, B and C of the drawing. Sodium acetate may thereafter be used in Step D in lieu of hydrofluoric acid as the precipitating agent resulting in the precipitation of the hexavalent Am as a yellow precipitate of sodium americyl acetate [$NaAm_2(C_2H_3O_2)_3$]. This procedure uses the insolubility of the above hexavalent Am compound in weakly acidic solutions to separate the Am from the soluble trivalent rare earth elements. The sodium americyl acetate precipitate may then be calcined at about 500° C for about 3 hours directly to the $AmO_2$ as in Step H. The Am that is not precipitated, i.e., that is in the filtrate and washings, may be easily recovered by an oxalate precipitation (similar to Steps I', J, K and L) and recycled through the process.

Although the sodium acetate precipitation process may be successfully used, such as in reducing rare earth element contamination 100 fold, and may provide yields in excess of 70 percent, the hydrofluoric acid precipitation process first described is preferred primarily because of better yields. The invention described herein enables one to separate rare earth elements Am by oxidizing the Am to the hexavalent state, thereafter forming insoluble fluoride precipitates of the rare earths and separating the Am from the rare earths, reducing Am to the trivalent state and precipitating americium oxalate using oxalic acid, calcining to $AmO_2$ and recycling the rare earth impurities containing the balance of the Am through the above cycle so as to extract or separate the balance of the Am. The rare earths for the purposes of this invention are defined as elements 39 and 57 through 71 from the Periodic Table of the Elements.

What is claimed is:

1. A method for separating americium oxide from rare earths comprising dissolving said americium oxide and said rare earths in nitric acid, adding ammonium hydroxide to said nitric acid to provide a first solution acidity of about 0.1 M in $H^+$, diluting said first solution to an americium concentration not greater than about 0.30 M, adding an about 25 percent mole excess of ammonium persulfate over the minimum quantity of ammonium persulfate required to oxidize the americium to the hexavalent state providing a second solution, heating said second solution at about 80° C for about 30 minutes, adding hydrofluoric acid to said second solution to provide a third solution of concentration of about 0.2 M in hydrofluoric acid and effecting formation of rare earth precipitates, mixing said solution for about 10 minutes, thereafter filtering said solution, washing said rare earth precipitates with water, adding the washings to the filtrate, adding ascorbic acid thereby reducing hexavalent americium to trivalent americium, adding from about 0.1 M to about 0.2 M excess of oxalic acid over the minimum quantity of oxalic acid required to react with said trivalent americium to the filtrate thereby providing a fourth solution and effecting formation of americium oxalate, heating to about 60° C for about 30 minutes, maintaining said fourth solution at room temperature for about 10 hours, filtering said americium oxalate precipitate, washing said precipitate with water, and calcining said precipitate by heating to about 600° C for about 4 hours to yield a purified americium oxide.

2. The method of claim 1 including recycling said fourth solution filtrate through the method of claim 1.

3. The method of claim 1 including recovering trapped americium in the rare earth precipitates comprising the further steps of dissolving said rare earth precipitates containing said trapped americium in nitric acid, adding sufficient oxalic acid to the solution containing said dissolved rare earth precipitates and said americium to thereby effect reaction with said oxalic acid and form americium oxalate, filtering to remove said americium oxalate, washing said americium oxalate with water, heating said americium oxalate to about 600° C for about 4 hours calcining said americium oxalate to americium oxide, and thereafter reprocessing said calcined americium oxide through the recited the process steps of the method of claim 1 in one or more additional stages.

* * * * *